Aug. 8, 1967 W. L. DEEG 3,335,402
CODE CHECKING CIRCUIT
Filed April 11, 1963
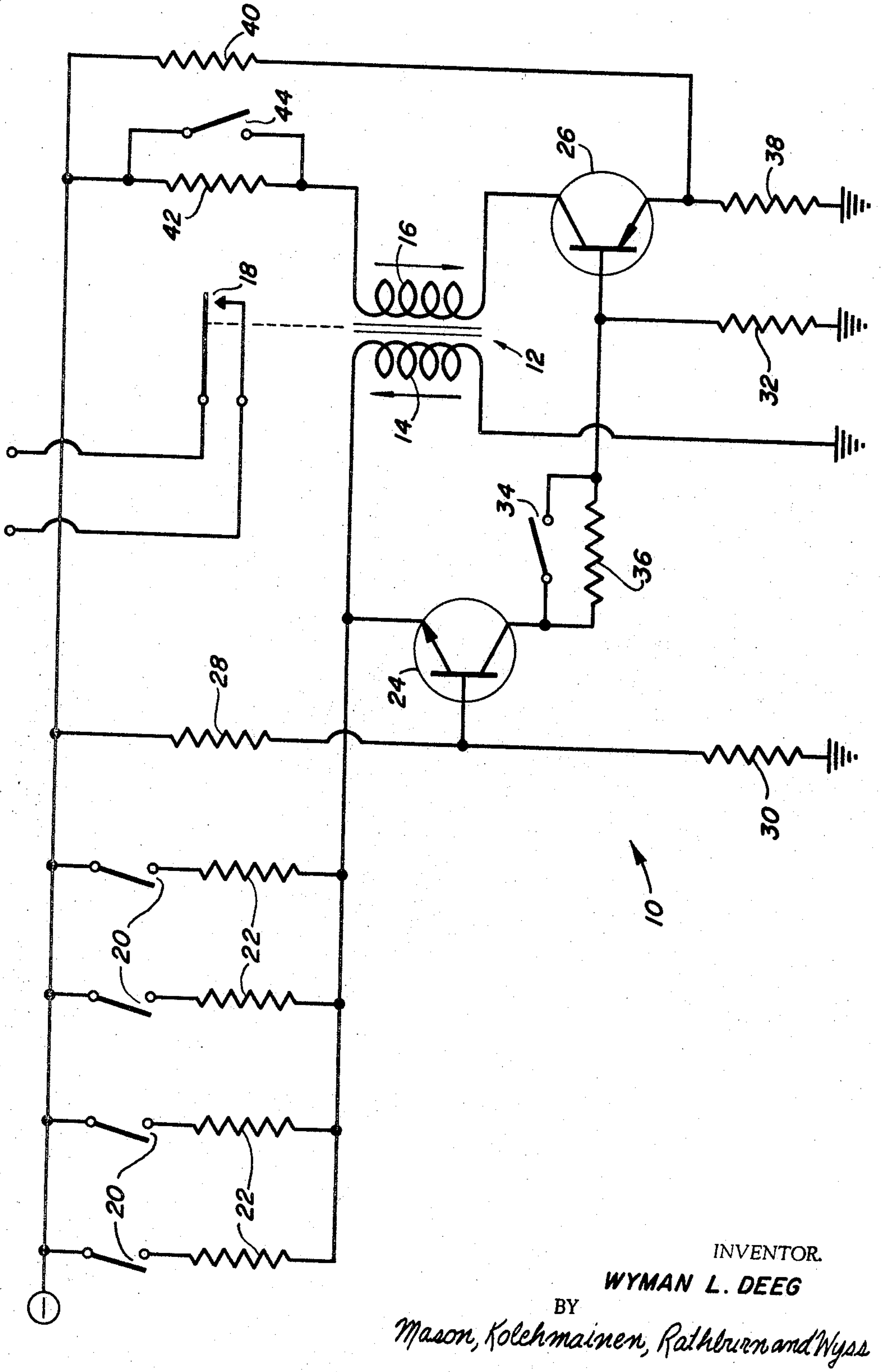
INVENTOR.
WYMAN L. DEEG
BY
Mason, Kolehmainen, Rathburn and Wyss
Attorneys United States Patent Office 3,335,402
Patented Aug. 8, 1967

3,335,402
CODE CHECKING CIRCUIT

Wyman L. Deeg, Glenview, Ill., assignor to C. P. Clare & Company, Chicago, Ill., a corporation of Delaware Filed Apr. 11, 1963, Ser. No. 272,440
2 Claims. (Cl. 340—146.1)

This invention relates to a checking circuit and, more particularly, to an arrangement for detecting the presence or absence of a given number of signals in a possible larger total number thereof.

In many types of data handling systems, data is received and used in different forms or codes. Frequently, it is desirable to determine whether the data at a given location has been provided in correct form before permitting further operations of the unit or a transmission of the data to a subsequent processing or storage point. As an example, decimal codes commonly comprise marking a desired "1" of "10" leads with an input potential in accordance with the value of the digit. A suitable checking circuit for this code would be one that provides an output signal when one and only one of the possible ten (N) input leads is in a reversed condition relative to the remaining nine leads.

Accordingly, one object of the present invention is to provide a new and improved code checking system.

Another object is to provide a code checking system including a magnetic switching means having a pair of windings which are differentially energized in accordance with the number of input signals.

Another object is to provide a control or detecting circuit in which the energization of one winding of an output control means when a given number of inputs is supplied provides an output signal and in which another winding of the output means is selectively energized in dependence on the number of inputs provided to prevent operation of the output means when more than the given number of inputs is supplied.

In accordance with these and many other objects, an embodiment of the present invention comprises an output means or sealed magnetic switch means having at least one movable magnetic element to which oppositely directed flux fields are supplied by two separate winding means. One of the winding means is selectively energized in accordance with the number of inputs received from the equipment to be checked and, in the illustrated system, is energized to operate the magnetic switching means to provide an output signal when at least one input signal is received. The second winding of the magnetic switching means is selectively energized under the control of one or more transistors responsive to the potential applied to the first winding. This selective energization of the second winding produces a flux field of reverse direction in the magnetic element and prevents the operation of the switching means to provide an output signal when a number of received input signals is in excess of one.

Many other objects and advantages of the present invention will become apparent from considering the following detailed description in conjunction with the single sheet of drawings which provides a schematic diagram of a checking or detecting circuit embodying the present invention.

The drawing illustrates a code detecting circuit which is indicated generally as 10 and which embodies the present invention. The circuit 10 is adapted to provide an output signal when only one of a plurality of possible input leads is provided with a signal or otherwise marked to distinguish it from the remainder of the leads. As an example, the circuit 10 could be used to determine whether the proper translation to a "one-of-ten" decimal code has been made. The circuit 10 provides an output when any one of the plurality of inputs is provided and does not provide an output when any number of inputs in excess of one is provided.

The device included in the detecting circuit 10 for controlling the selective production of the output signal under the conditions set forth above is a magnetic switching means 12 which includes a pair of windings 14 and 16 for applying oppositely directed flux fields to one or more magnetic elements providing a pair of normally open output contacts 18. These magnetic elements can form parts of a sealed reed switch or a sealed mercury wetted contact switch which can be biased either magnetically or mechanically to a single-side-stable condition. Thus, by selectively energizing the windings 14 and 16 to apply oppositevly directed flux fields to the magnetic elements in the switch capsule, the output contacts 18 are selectively opened and closed.

The code inputs to the circuit 10 are shown as being provided by a plurality of switches 20 which each represent a bit input and which are connected at one side to a negative potential source of a nominal 48 volts. Each switch 20 is connected through a resistance element 22 to one terminal of the winding 14, the other terminal of which is connected directly to ground. The switches 22 are shown as the input signal source to simplify the illustration of the invention, and these signals could be provided by semiconductor devices, vacuum tubes, or any other controlled conduction means or voltage source. The number of parallel arms provided by the switches 20 and the resistance elements 22 is equal to the highest number of possible inputs to the circuit 10.

Assuming that one and only one of the switches 20 is closed, current flows through the winding 14, the closed one of the switches 20, and its individual resistance element 22 to energize the winding 14 so that a magnetic flux is applied to the magnetic elements of the sealed switch to close the contacts 18. The closed contacts provide an output or indication that only a single input or signal has been supplied to the circuit 10.

When a second or additional ones of the switches 20 are closed representing additional inputs, a pair of transistors 24 and 26 prevent the operation of the magnetic switching means 12. More specifically, the resistance or impedance of the windings 14 and 16 is substantially equal to the value of the impedance of each of the resistance elements 22, and these resistances are, in turn, substantially equal in value to those of a pair of resistance elements 28 and 30 which form a voltage divider connected to the base electrode of the transistor 24. When only one of the switches 20 is closed, the potential applied to the base of the transistor 24 is below or the same as the potential applied to the emitter of this transistor, and the transistor 24 is in a nonconductive state.

Whenever a second one of the switches 20 is closed to place a second resistance 22 in parallel with the resistance 22 initially placed in the circuit, the potential applied to the emitter of the transistor 24 becomes more negative. This places the transistor 24 in a conductive condition so that a negative potential is applied across a base resistor 32 and to the base electrode of the transistor 26, either directly through a closed switch 34 or indirectly through a series resistance 36. The emitter electrode of the transistor 26 is normally held at a potential that is negative with respect to its base electrode by a voltage divider including a pair of resistance elements 38 and 40 connected between the negative potential and ground.

The negative potential supplied by the conductive transistor 24 drives the base of the transistor 26 negative with respect to the emitter to place the transistor 26 in a conductive condition so that current flows through the winding 16 over a circuit including either a series resistance 42 or a closed switch 44. When the winding 16 is energized, a flux opposite to that produced by the energization of the winding 14 is applied to the magnetic elements in the sealed switch. This oppositely directed flux prevents the operation of the switch 12 and, accordingly, the closure of the contacts 18. Thus, the contacts 18 are opened and an output is not provided by the circuit 10 whenever more than one input signal is provided.

As indicated above, the magnetic switching means 12 can be provided by a number of different types of switching devices. If the normally open output contacts 18 are provided by a sealed dry reed switch, the two magnetic elements to which the flux fields generated by the windings 14 and 16 are applied are normally maintained in a spaced and overlapping relationship. When only the winding 14 is energized in the manner described above, the flux linking the two magnetic elements in the sealed reed switch closes the contacts 18 to provide an output signal. On the other hand, when the provision of more than a single input places the transistor 26 in conduction, the energization of the winding 16 produces an oppositely directed flux field in the two magnetic elements of the reed switch so that these reeds are separated by their inherent resilience to open the output contacts 18. When the magnetic reed switch is used in the switching means 12, and the switch 34 is closed to connect the collector of the transistor 24 directly to the base of a transistor 26, and the switch 44 is opened to place the resistance 42 in series with the winding 16. It is desirable to insert the resistance 42 in series with the winding 16 to limit the current flow therethrough. This is necessary because the reed switch is not sensitive to the polarity of the applied field, and the generation of an excessively large field by the energization of the winding 16 could produce a false reclosure of the output contacts 18 if the field induced by the winding 16 exceeds the magnitude of the field induced by the winding 14 by more than the "operate" value of the reed switch.

The code checking circuit 10 can also be formed by using a polarity sensitive or mangetically biased switching unit. As an example, the magnetic switching means 12 can comprise a mercury switch in which a magnetic bias is applied to give the switch a single-side-stable characteristic in which the contacts 18 are normally open. The flux field produced by the energization of the winding 14 is such as to oppose the magnetic bias and to close the contacts 18 when the field generated by the winding 14 has a large enough value. Thus, the opposite field produced by the energization of the winding 16 tends to aid the magnetic bias to return the switching means 12 to its normal position in which the contacts 18 are open.

When a polarized switching means 12 is used, the contacts 44 are closed to shunt the resistance 42, and the contacts 34 are opened to insert the resistance 36 in series between the collector of the transistor 24 and the base of the transistor 26. The insertion of the resistance 36 tends to limit the current shunting the winding 14 which passes through the transistor 24. It is desirable to limit this current when a large number of inputs are provided. The switches 34 and 44 and one or the other of the resistance elements 36 and 42 would not be used in the circuit 10 designed for a specific one of the two types of magnetic switches 12.

The use of the polarized magnetic switching means 12 is preferred because it is not necessary to exercise any particular degree of control over the relative magnitudes of the currents flowing in the windings 14 and 16 as is the case when a polar insensitive reed switch, for instance, is used. This is true because the energization of the winding 16 by any current in a suitable range provides a flux field aiding the magnetic bias and holds the contacts 18 in an open condition when the current through the winding 14 varies over a relatively large range. Any increase in the value of current passing through the winding 16 merely tends to insure that the contacts 18 remain open and does not give rise to the possibility that the flux field will become large enough to cause false reoperation of the switching means 12.

Although the present invention has been described with reference to a number of illustrative embodiments thereof, it should be understood that numerous other modifications and embodiments can be devised by those skilled in the art that will fall within the spirit and scope of the principles of the present invention.

What is claimed as new and desired to be secured by Letters Patent of the United States is:

1. A circuit for detecting the presence of a single signal in a total possible number M of signals comprising a switching means including contacts and a pair of operating windings, the windings providing oppositely poled flux fields for controlling the operation of the contacts, first circuit means including the contacts for providing an indication that a single signal is present, a number M of signal input terminals each providing an input signal of a given value, second circuit means connecting each of the signal input terminals in series with a first one of the pair of windings, the given value of each one of the input signals being such as to produce a flow of current through the first winding sufficient to operate the contacts, and third circuit means connected between all of the signal input terminals and the second one of the pair of windings for producing a flow of current through the second winding to inhibit operation of the contacts when an input signal is present at more than one of the signal input terminals.

2. The circuit set forth in claim 1 in which the contacts are biased to their normal position and in which the flux field generated by the energization of the second winding aids the bias to hold the contacts in their normal position.

References Cited

UNITED STATES PATENTS

| | | | |
|---|---|---|---|
| 2,153,737 | 4/1939 | Spencer | 340—146.1 |
| 2,470,145 | 5/1949 | Clos | 340—146.1 |
| 2,471,126 | 5/1949 | Spencer et al. | 340—146.1 |
| 2,688,050 | 8/1954 | Harris | 340—146.1 |
| 3,242,411 | 3/1966 | Lilienfeld | 320—43 |

OTHER REFERENCES

M. V. Wilkes, Automatic Digital Computers; New York, 1956, pages 233–234.

MALCOLM A. MORRISON, *Primary Examiner.*

M. PALLEN, K. MILDE, *Assistant Examiners.*